United States Patent [19]

Hattori

[11] Patent Number: 4,457,413

[45] Date of Patent: Jul. 3, 1984

[54] FLUID TORQUE CONVERTER

[75] Inventor: Torao Hattori, Wako, Japan

[73] Assignee: Honda Giken Kogyo Kabushiki Kaisha, Tokyo, Japan

[21] Appl. No.: 318,985

[22] Filed: Nov. 6, 1981

[30] Foreign Application Priority Data

Nov. 7, 1980 [JP] Japan .................................. 55-157263

[51] Int. Cl.³ ............................................ F16D 39/00
[52] U.S. Cl. ..................................... 192/3.3; 192/3.31; 192/0.076; 192/0.092
[58] Field of Search ....................... 192/3.28, 3.29, 3.3, 192/3.31, 45, 55, 85 AA, 0.076, 0.092

[56] References Cited

U.S. PATENT DOCUMENTS 3,557,921 1/1971 Takada .................................. 192/45
4,252,031 2/1981 Nishimura et al. ............. 192/113 B Primary Examiner—George H. Krizmanich
Assistant Examiner—Mark Manley
Attorney, Agent, or Firm—Armstrong, Nikaido, Marmelstein & Kubovcik

[57] ABSTRACT

A fluid torque converter comprising a pump wheel connected to a driving power source, a turbine wheel connected to a driven member, the pump wheel and turbine wheel being connected to each other via a working fluid, and a one-way clutch of on-off type provided between the pump wheel and turbine wheel and adapted to mechanically connect the pump wheel and turbine wheel together when the one-way clutch is in a coupled state. The one-way clutch has a driving clutch member connected to the pump wheel and provided with a first conical surface, and a driven clutch member connected to the turbine wheel and provided with a second conical surface in opposed and parallel relation to the first conical surface. A plurality of elastic wedge rollers are provided between the first and second conical surfaces in a circumferentially spaced relation. The driven clutch member is actuated hydraulically so as to be engaged with and disengaged from the driving clutch member, and takes an operative position in which the driven clutch member is mechanically connected to the driving clutch member via the wedge rollers, and an inoperative position in which such mechanical connection between the driven and driving clutch members is cut off.

5 Claims, 4 Drawing Figures

FLUID TORQUE CONVERTER

BACKGROUND OF THE INVENTION

1. Field of the Invention

This invention relates to a fluid torque converter, which permits connecting a pump wheel and a turbine wheel together directly by means of a direct-coupling clutch capable of connecting and disconnecting the pump wheel and turbine wheel to and from each other.

2. Description of the Prior Art

A direct-coupling clutch for a fluid torque converter for vehicles, such as automobiles, has been used to directly couple a pump wheel and a turbine wheel for preventing slippage between the pump wheel and turbine wheel to improve the torque transmission efficiency. In such a direct-coupling clutch, a shock occurs when the clutch is put in a coupled state, to not only give the driver an unpleasant feeling but also spoil the durability of the direct-coupling clutch and power transmission system. When the fluid torque converter is in a directly-connected state, the fluctuation of an engine torque is transmitted directly to the power transmission system. Especially, when the engine is decelerated suddenly, a shock occurs and is transmitted to the power transmission system. This inevitably deteriorates the driving comfort.

SUMMARY OF THE INVENTION

Therefore, an object of the present invention is to provide a fluid torque converter, which is able to absorb and alleviate a shock occurring when a direct-coupling clutch is put in a coupled state, and which has a high durability.

Another object of the present invention is to provide a fluid torque converter for vehicles of the kind having a pump wheel connected to an engine and a turbine wheel connected to a driving wheel, wherein the pump and turbine wheels are connected together mechanically in a clutch-operated region to transmit power from the engine to a driving wheel, i.e. from the pump wheel to the turbine wheel; and the mechanical connection between the pump wheel and turbine wheel is cut off automatically to shift the mechanical transmission to a fluid transmission when the vehicle is decelerated or run by an inertia force, thus enabling economical running of the vehicle with much less amount of fuel than a vehicle employing a conventional fluid torque converter of this kind and alleviating a shock occurring upon deceleration of the vehicle.

The above and other objects as well as advantageous features of the invention will become apparent from the following description of the preferred embodiment taken in conjunction with the accompanying drawings.

DESCRIPTION OF THE PREFERRED EMBODIMENT

Figure 1:
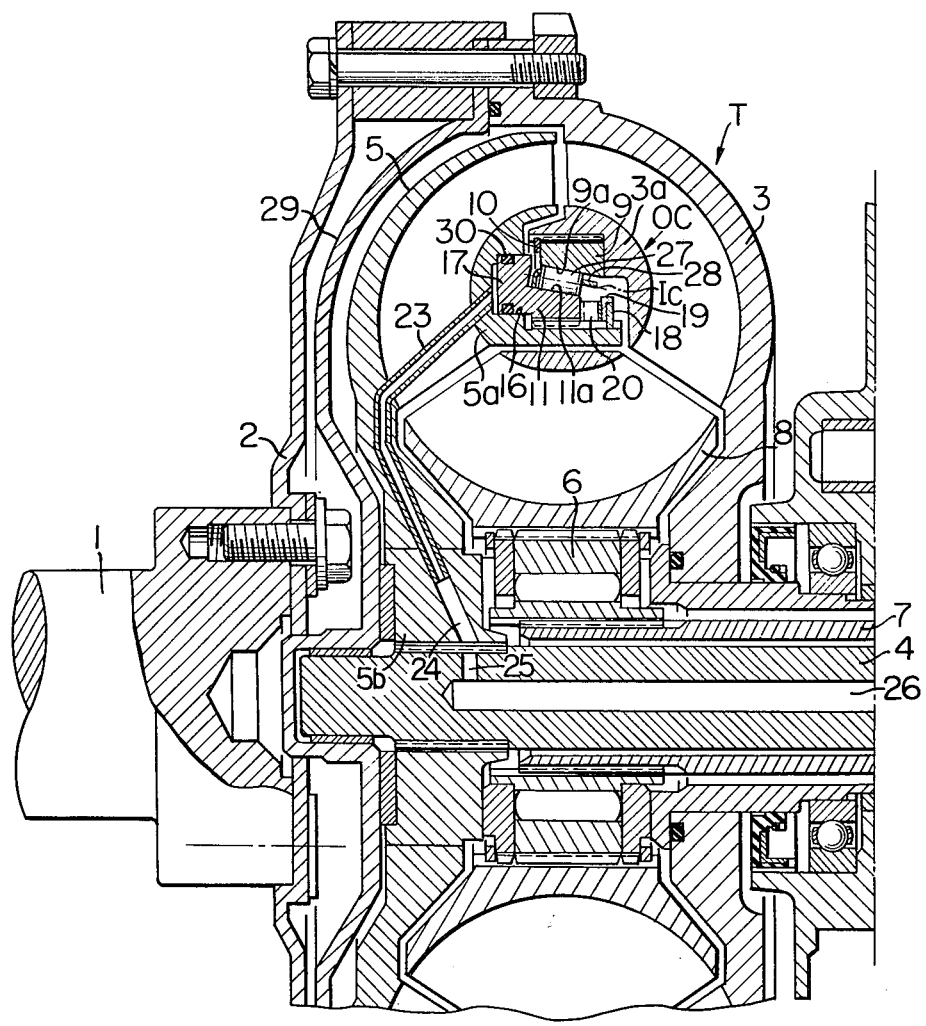
FIG. 1 is a longitudinal sectional view of an embodiment of the present invention.
Figure 3:
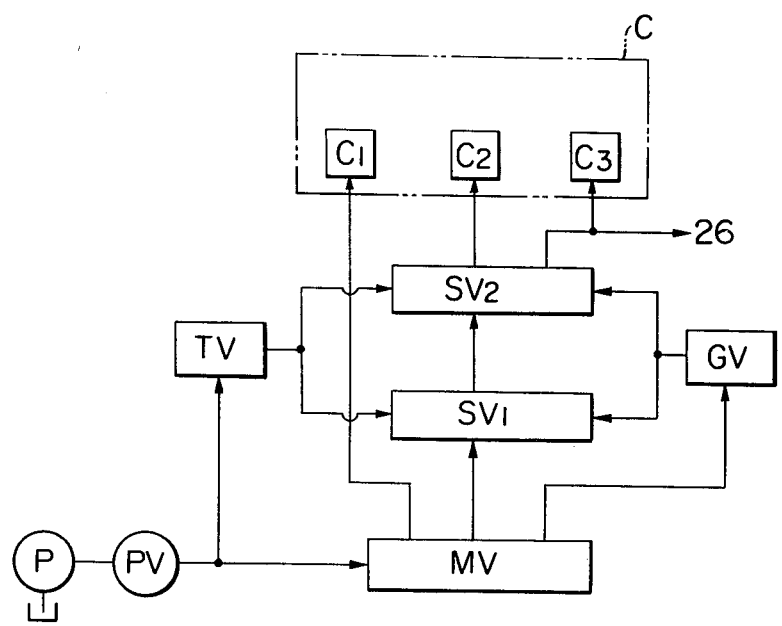
FIG. 3 is a schematic diagram of a hydraulic circuit in a transmission.

An embodiments of the present invention, which is applied to a vehicle, such as an automobile, will be described with reference to the accompanying drawings. Referring to FIG. 1, a fluid torque converter T according to the present invention has a pump wheel 3 connected to an engine output shaft 1 via a drive plate 2, a turbine wheel 5 connected to a turbine shaft 4, and a stator wheel 8 connected to a stator shaft 7 via a one-way clutch 6. The turbine shaft 4 is connected to a driving wheel (not shown) via a transmission C (FIG. 3).

A one-way clutch OC is provided between the pump wheel 3 and turbine wheel 5. The one-way clutch OC, which is capable of connecting and disconnecting the pump wheel 3 and turbine wheel 5 to and from each other, permits when in a coupled state transmitting power solely from the pump wheel 3 to the turbine wheel 5. The construction of the one-way clutch OC will now be described.

An annular driving clutch member 9 having a conical driving surface 9a at its inner periphery is axially spline-connected to an inner circumferential wall 3a of the pump wheel 3 and is held at one end thereof by a snap ring 10 so as to prevent the driving clutch member 9 from slipping out. A driven clutch member 11 having at its outer periphery a conical driven surface 11a, which surface is opposed and parallel to the conical driving surface 9a, is spline-connected to an inner circumferential wall 5a of the turbine wheel 5 in an axially slidable manner.

The driven clutch member 11 is provided at one end thereof with a piston 17 formed integrally therewith. The piston 17 is fitted slidably in a hydraulic chamber 16 defined by the inner circumferential wall 5a of the turbine wheel 5. The driven clutch member 11 is urged in the direction in which the driven clutch member 11 is moved away from the driving clutch member 9, i.e. in the leftward direction in FIG. 1 by a corrugated spring 20, which is interposed with a washer 19 between the other end of the driven clutch member 11 and a snap ring 18 held on end of the inner circumferential wall 5a of the turbine wheel 5. The hydraulic chamber 16 is communicated with an oil passage, which is formed in the turbine shaft 4 so as to extend in the direction of axis thereof, via an oil pipe 23 cast in the turbine wheel 5, an oil passage 24 formed in a boss 5b thereof and a radial oil passage 25 in the turbine shaft 4.

Figure 2:
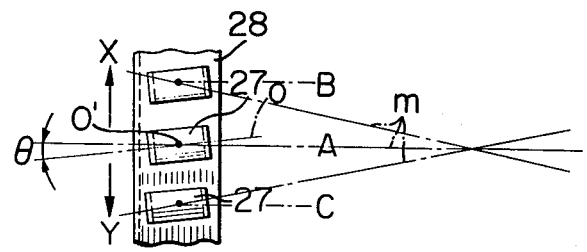
FIG. 2 is a plan view of a roller retainer and wedge rollers shown in FIG. 1.

A plurality of cylindrical wedge rollers 27 made of an elastic material are provided between the conical driving and driven surfaces 9a, 11a. The wedge rollers 27 are held in an annular, cross-sectionally L-shaped roller retainer 28 in such a manner that, when the one-way clutch OC is not in operation, the central axis O of each of the wedge rollers 27 as shown in FIG. 2 is positioned between the conical driving and driven surfaces 9a, 11a and inclined at a predetermined angle θ with respect to a generatrix m of an imaginary conical surface Ic having a vertical angle equal to those of the conical surfaces 9a, 11a, the generatrix passing the center O' of each of the wedge rollers 27. Therefore, when a pressure oil is introduced into the hydraulic chamber 16 to move the driven clutch member 11 to be pressed rightwardly in FIG. 1 against the resilient force of the corrugated spring 20 via the piston 17 and come close to the driving clutch member 9, the wedge rollers 27 are placed in press contact with the conical driving and driven surfaces 9a, 11a. When the driving clutch member 9 is then rotated relatively to the driven clutch member 11 in the X-direction in FIG. 2, the wedge rollers 27 are also rolled by the rotary force thereof on the conical driven surface 11a in the X-direction from a position A to a position B. Thus, the angle $\theta$ of inclination with respect to the generatrix m gradually increases to displace the conical driven surface 11a into closer relation to the conical driving surface 9a, and the wedge rollers 27 come into engagement with both of the conical driving and driven surfaces 9a, 11a to cause the driving and driven clutch members 9, 11 to be connected together mechanically. At this time, a shock occurring due to the connection of the driving and driven clutch members 9, 11 can be lightened or absorbed by the elastic deformation of the wedge rollers 27. When the driving clutch member 9 is rotated relatively to the driven clutch member 11 in the Y-direction, the wedge rollers 27 are rolled on the conical driven surface 11a in the Y-direction. Thus, the angle $\theta$ of inclination of the central axis O of each of the wedge rollers 27 with respect to the generatrix m gradually decreases to displace the conical driven surface 11a away from the conical driving surface 9a. When the angle $\theta$ has then become zero, a clearance is produced between the wedge rollers 27 and the conical driving and driven surfaces 9a, 11a, so that the rotary force is not transmitted to the wedge rollers 27. Accordingly, the wedge rollers 27 are rotated idly with respect to the conical driving and driven surfaces 9a, 11a, and the transmission of power between the driving and driven members is interrupted.

Referring to FIG. 1, reference numeral 29 denotes a cover for the torque converter, and 30 a seal provided between the driven clutch member 11 and the inner circumferential surface of the hydraulic chamber 16 formed in the inner circumferential wall 5a of the turbine wheel 5.

A hydraulic circuit for the transmission C including the fluid torque converter T will be described with reference to FIG. 3. A manual valve MV, which is operated manually via a hydraulic control valve PV, is connected to an oil passage extended from a discharge port of a hydraulic pump P. The manual valve MV is also connected to a low-speed clutch $C_1$, which is adapted to control an operation of a low-speed power transmission system, and to an intermediate-speed clutch $C_2$, which is adapted to control an operation of an intermediate-speed power transmission system, via first and second shift valves $SV_1$, $SV_2$ connected in series with each other. The second shift valve $SV_2$ is connected to a high-speed clutch, which is adapted to control an operation of a high-speed power transmission system, and to the oil passage 26 formed in the turbine shaft 4 in the fluid torque converter T. The first and second shift valves $SV_1$, $SV_2$ are adapted to be shifted between first and second positions by first and second hydraulic pressure generators TV, GV, respectively. The first hydraulic pressure generator TV is connected to an oil passage between the hydraulic control valve PV and manual valve MV and adapted to generate a hydraulic pressure in accordance with the degree of opening of a throttle. The second hydraulic pressure generator GV is connected to the manual valve MV and adapted to generate a hydraulic pressure in accordance with a vehicle speed. When the first shift valve $SV_1$ is in the first position, the communication between the intermediate-speed clutch $C_2$ and the manual valve MV is cut. When the first shift valve $SV_1$ is in the second position with the second shift valve $SV_2$ in the first position, the intermediate-speed clutch $C_2$ is communicated with the manual valve MV. When both of the first and second shift valves $SV_1$, $SV_2$ are in the second position, both of the high-speed clutch $C_3$ and the axially-extending oil passage 26 in the turbine shaft 4 are communicated with the manual valve MV, and a speed changing operation can be carried out with low, intermediate and high power transmission systems by properly actuating the low-, intermediate-and high-speed clutches $C_1$, $C_2$, $C_3$ through manual operations of the manual valve MV. When the high-speed clutch $C_3$ is actuated, the pressure oil is supplied simultaneously into the axially-extending oil passage 26 so that the pressure in the hydraulic chamber 16 is increased. As a result, the piston 17 and driven clutch member 11 are pressed against the corrugated spring 20 in the rightward direction in FIG. 1 to place the one-way clutch OC in a coupled state.

The operation of this embodiment will now be described. When the engine output shaft is rotated, the pump wheel 3 connected thereto is rotated. Consequently, the turbine wheel 5 is rotated via a fluid provided between the pump wheel 3 and turbine wheel 5, and the turbine shaft 4 is also rotated together. The stator wheel 8 produces a torque-increasing effect in a speed change region of the fluid torque converter T while being rotated idly with respect to the pump wheel 3 and turbine wheel 5 in a clutch-operated region.

In the speed change region of the fluid torque converter T, no pressure oil is supplied into the axially-extending oil passage 26 in the turbine shaft 4, and the pressure in the hydraulic chamber 16 in the one-way clutch OC is low. Accordingly, the driven clutch member 11 spline-connected to the inner circumferential wall 5a of the turbine wheel 5 is pressed in the hydraulic chamber 16 by the corrugated spring 20 in the leftward direction in FIG. 1 and is in a position away from the driving clutch member 9, which places the one-way clutch OC in a cut-off state, so that the transmission of power between the pump wheel 3 and turbine wheel 5 is carried out only by a fluid transmission operation.

When the high-speed clutch $C_3$ of the transmission C is actuated, a pressure oil is also supplied into the axially-extending oil passage 26 in the turbine shaft 4. The pressure oil then flows into the hydraulic chamber 16 via the radially-extending oil passages 25, oil passage 24 and oil pipe 23. As a result, the driven clutch member 11 is slided rightwardly in FIG. 1 via the piston 17 to bring the wedge rollers 27 into press contact with the conical driving and driven surfaces 9a, 11a. As is shown in FIG. 2, the wedge rollers 27 are held in the roller retainer 28 in such a manner that the central axis O of each of the wedge rollers 27 is inclined with respect to the generatrix m of an imaginary conical surface Ic, which generatrix is positioned between the conical driving and driven surfaces and passes the center O' of each of the wedge rollers 27. Therefore, when the driving clutch member 9 is rotated in the X-direction in FIG. 2, the wedge rollers 27 are caused to roll in a direction to displace the conical driven surface 11a into closer relation to the conical driving surface 9a, to connect the driving and driven clutch members 9, 11 together, whereby the pump wheel 3 and turbine wheel 5 are directly coupled to each other. A shock produced at this coupling is lightened or absorbed by the elastic deformation of the wedge rollers 27.

When the vehicle is decelerated suddenly or travels by an inertia force with the pump wheel 3 and turbine wheel 5 connected together directly, a reverse load is applied to the turbine shaft 4, to thereby make the rotational speed of the driven clutch member 11 higher than that of the driving clutch member 9 so that the driving clutch member 9 is rotated in the Y-direction in FIG. 2 with respect to the driven clutch member 11 and the wedge rollers 27 are caused to roll in a direction to displace the conical driven surface 11a, away from the conical driving surface 9a, to put the driving and driven clutch members 9, 11 in a freely rotatable state with respect to each other. Consequently, the mechanical transmission of power from the turbine wheel 5 to the pump wheel 3 is cut automatically to be shifted to a fluid transmission operation.

Figure 4:
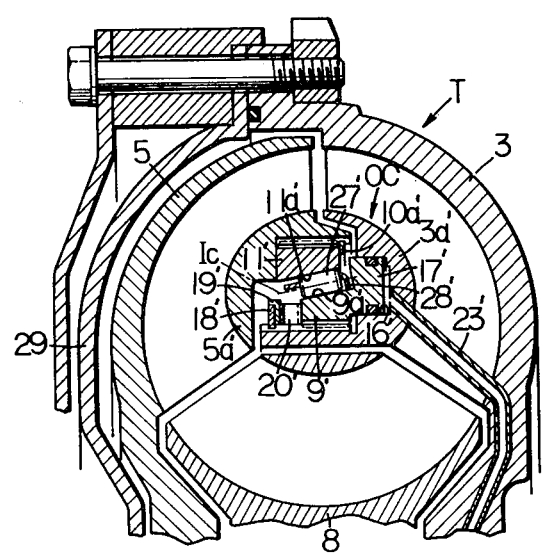
FIG. 4 is a longitudinal sectional view of another embodiment of the present invention.

In another embodiment shown in FIG. 4, driving clutch member 9' is mounted on the pump wheel 3 and is provided at one end thereof with a piston 17' formed integrally therewith.

The driven clutch member 11' is mounted on the turbine wheel 5. These and the remaining elements shown with primed numbers function indentically with the equivalent parts shown in FIG. 1. The operation is also the same.

In the embodiment described above, the supplying and discharging of a working oil to and from the hydraulic chamber 16 in the one-way clutch OC is to be controlled as shown in FIG. 3 in relation to the vehicle speed and the degree of opening of the throttle valve, however, it may be otherwise controlled, for example, in relation to the vehicle speed only, or by opening and closing a valve in relation to the vehicle speed via which valve an oil passage for supplying the working oil to speed change elements such as speed change clutches $C_1$, $C_2$, $C_3$ in the transmission C and the hydraulic chamber 16 in the one-way clutch OC are communicated with each other.

The wedge rollers 27 may be disposed differently from those employed in the above-described embodiment in that the axis of each thereof is inclined in the opposite direction with respect to the generatrix m of the imaginary conical surface Ic. In this case, when the driven clutch member 11 is rotated in the X-direction in FIG. 2 with respect to the driving clutch member 9, the wedge rollers 27 are caused to roll in a direction to displace the conical driven surface 11a, in closer relation to the conical driving surface, 9a to allow the driven and driving clutch members 11, 9 to be connected together mechanically. Therefore, when the one-way clutch OC is put in a coupled state in an engine-braking operation, a reverse load can be transmitted in one direction only, i.e. from the driven clutch member 11 to the driving clutch member 9 via the wedge rollers 27, so that the engine-braking effect can be improved.

According to the present invention as described above, a one-way clutch of an on-off type, which permits in a coupled state connecting together mechanically a pump wheel connected to a driving power source such as an engine and a turbine wheel connected to a driven member such as a driving wheel, is provided between the pump wheel and turbine wheel. Accordingly, when the one-way clutch is put in a cut-off state, the transmission of power between the pump wheel and turbine wheel is carried out via a fluid to allow an increased torque to be transmitted from the driving power source to the driven member. On the other hand, when the one-way clutch is put in a coupled state, the pump wheel and turbine wheel can be connected together mechanically. When the one-way clutch is designed in such a manner that the power is transmitted only in the direction from the pump wheel to the turbine wheel, no slip takes place between the pump wheel and turbine wheel at the time of coupling of the one-way clutch to ensure the mechanical transmission of power from the driving power source to the driven member, whereby the transmission efficiency can be improved to a remarkable extent. In addition, the transmission of a reverse load from the driven member to the driving power source can be avoided automatically by the operation of the one-way clutch, thus preventing useless reverse load from being applied to the driving power source.

Further, when the one-way clutch is so constructed as to allow only the unidirectional transmission of power from the turbine wheel to the pump wheel, the one-way clutch can be placed in a coupled state, for example, in a case where the engine-braking operation is required, to transmit a reverse load mechanically from the driven member to the driving power source via the one-way clutch.

A shock occurring upon actuation of the one-way clutch can be alleviated or absorbed by the elastic deformation of wedge roller means made of an elastic material and interposed between the first conical surface of the driving clutch member connected to the pump wheel and the second conical surface of the driven clutch member connected to the turbine wheel, thus improving the durability of the one-way clutch and hence of the fluid torque converter to a great extent.

The above-mentioned wedge roller means comprises a plurality of cylindrical wedge rollers disposed between the first and second conical surfaces in a circumferentially spaced relation with each other so that a large load, which is applied to the wedge roller means when the one-way clutch is connected, can be distributed to all of the wedge rollers to reduce the amount of load to be imposed on each of the rollers whereby the durability of the one-way clutch can be further improved.

The one-way clutch referred to above is provided in a space defined by the inner walls of the pump wheel and turbine wheel. Therefore, the provision of the one-way clutch does not cause an increase in the dimensions, particularly the axial length, of the fluid torque converter. Thus, a compact fluid torque converter can be obtained.

Furthermore, when the fluid torque converter according to the present invention is provided in a power transmission passage connecting an engine of a vehicle and a driving wheel together, a shock produced at the time of coupling of the one-way clutch is remarkably reduced owing to the elastic deformation of the wedge roller means. Accordingly, the transmission mode of the fluid torque converter can be shifted from a fluid transmission to a mechanical transmission smoothly with almost no shock applied to the power transmission system. This ensures the driver to have a much better ride.

While the present invention has been described with reference to the preferred embodiment thereof, it will be understood by those skilled in the art that various modification can be made without departing from the spirit and scope of the appended claims.

What is claimed is:

1. A fluid torque converter comprising: a pump wheel connected to a driving power source; a turbine wheel connected to a driven member; said pump wheel and said turbine wheel being connected to each other via a working fluid; and a one-way clutch arranged in a space defined by inner walls of said pump wheel and said turbine wheel and adapted to mechanically connect said pump wheel and said turbine wheel together when said one-way clutch is in a coupled state; said one-way clutch comprising a driving clutch member spline-connected to the inner wall of said pump wheel and having a first conical surface, a driven clutch member connected to said turbine wheel and having a second conical surface in opposed and parallel relation to said first conical surface, a wedge roller means of an elastic material provided between said first and second conical surfaces, and means for moving said driven and driving clutch members relatively to each other between an operative position in which said driven and driving clutch members are mechanically connected to each other via said wedge roller means, and an inoperative position in which said driven and driving clutch members are mechanically disconnected from each other, said means for moving said driving and driven clutch members relatively to each other between said operative and inoperative positions comprising a hydraulic chamber formed in the inner wall of said pump wheel and communicated selectively with a hydraulic power source and an oil tank by a change-over valve which is adapted to control supply of hydraulic pressure to the hydraulic chamber, a piston slidably fitted in said hydraulic chamber and operatively connected to said driving clutch member, and means biasing said piston towards said hydraulic chamber, said piston being operated under the action of the hydraulic pressure in said hydraulic chamber to move said driving clutch member along the inner wall of said pump wheel into engagement with and disengagement from said driven clutch member.

2. A fluid torque converter comprising: a pump wheel connected to a driving power source; a turbine wheel connected to a driven member; said pump wheel and said turbine wheel being connected to each other via a working fluid; and a one-way clutch arranged in a space defined by inner walls of said pump wheel and said turbine wheel and adapted to mechanically connect said pump wheel and said turbine wheel together when said one-way clutch is in a coupled state; said one-way clutch comprising a driving clutch member connected to said pump wheel and having a first conical surface, a driven clutch member spline-connected to the inner wall of said turbine wheel and having a second conical surface in opposed and parallel relation to said first conical surface, a wedge roller means of an elastic material provided between said first and second conical surfaces, and means for moving said driven and driving clutch members relatively to each other between an operative position in which said driven and driving clutch members are mechanically connected to each other via said wedge roller means, and an inoperative position in which said driven and driving clutch members are mechanically disconnected from each other, said means for moving said driving and driven clutch members relatively to each other between said operative and inoperative positions comprising a hydraulic chamber formed in the inner wall of said turbine wheel and communicated selectively with a hydraulic power source and an oil tank by a change-over valve which is adapted to control supply of hydraulic pressure to the hydraulic chamber, a piston slidably fitted in said hydraulic chamber and operatively connected to said driven clutch member, and means biasing said piston towards said hydraulic chamber, said piston being operated under the action of the hydraulic pressure in said hydraulic chamber to move said driven clutch member along the inner wall of said turbine wheel into engagement with and disengagement from said driving clutch member.

3. A fluid torque converter according to claim 1 or 2, wherein said driving power source is an engine of a vehicle, said driven member is a driving wheel, and said fluid torque converter is interposed in a power transmission system which is adapted for transmitting power from said engine to said driving wheel.

4. A fluid torque converter according to claim 1 or 2 wherein said wedge roller means comprises a plurality of cylindrical rollers disposed between said first and second conical surfaces in a circumferentially spaced relation with each other.

5. A fluid torque converter according to claim 4, wherein said first and second conical surfaces each define an angle, and wherein said rollers are arranged such that, when said one-way clutch is not in operation, the central axis of each of said rollers is inclined with respect to a generatrix of an imaginary conical surface passing through the center of each of said rollers and having a vertical angle equal to those of said first and second conical surfaces.

* * * * *